US011883341B2

(12) United States Patent
Thomas et al.

(10) Patent No.: US 11,883,341 B2
(45) Date of Patent: Jan. 30, 2024

(54) PATIENT TURNER-PULLER

(71) Applicants: Mammen Thomas, Seattle, WA (US); Sarah Peter, Los Angeles, CA (US); Elizabeth Thomas, Seattle, WA (US)

(72) Inventors: Mammen Thomas, Seattle, WA (US); Sarah Peter, Los Angeles, CA (US); Elizabeth Thomas, Seattle, WA (US)

( * ) Notice: Subject to any disclaimer, the term of this patent is extended or adjusted under 35 U.S.C. 154(b) by 0 days.

(21) Appl. No.: 17/984,000

(22) Filed: Nov. 9, 2022

(65) Prior Publication Data

US 2023/0110796 A1 Apr. 13, 2023

Related U.S. Application Data

(63) Continuation of application No. 17/017,577, filed on Sep. 10, 2020, now Pat. No. 11,529,277.

(51) Int. Cl.
*A61G 7/10* (2006.01)

(52) U.S. Cl.
CPC ......... *A61G 7/1057* (2013.01); *A61G 7/1015* (2013.01); *A61G 7/1023* (2013.01); *A61G 7/1026* (2013.01); *A61G 2200/32* (2013.01); *A61G 2203/10* (2013.01)

(58) Field of Classification Search
CPC .. A61G 7/1057; A61G 7/1015; A61G 7/1023; A61G 7/1026; A61G 2200/32; A61G 2200/10
USPC .................................................... 5/88.1, 89.1
See application file for complete search history.

(56) References Cited

U.S. PATENT DOCUMENTS

| | | | | |
|---|---|---|---|---|
| 3,597,774 | A * | 8/1971 | Warren | A61G 7/1026 5/84.1 |
| 4,747,170 | A * | 5/1988 | Knouse | A61G 7/1026 5/81.1 HS |
| 7,725,964 | B2 * | 6/2010 | Minning | A61G 7/1025 5/81.1 R |
| 8,710,950 | B2 * | 4/2014 | Lubbers | A61G 7/0506 340/13.24 |
| 9,192,535 | B2 * | 11/2015 | Sverdlik | A61G 7/1044 |
| 9,320,667 | B2 * | 4/2016 | Tilk | A61G 7/1036 |
| 11,324,650 | B2 * | 5/2022 | Zhou | A61G 7/1032 |
| 11,478,390 | B2 * | 10/2022 | Thomas | A61G 7/1015 |
| 11,529,277 | B2 * | 12/2022 | Thomas | A61G 7/1026 |
| 2003/0074732 | A1 * | 4/2003 | Hanson | A61G 7/08 5/81.1 R |
| 2006/0273292 | A1 * | 12/2006 | Milam | B66D 3/20 254/343 |

(Continued)

FOREIGN PATENT DOCUMENTS

GB 2311001 A * 9/1997 ........... A61G 7/1026

*Primary Examiner* — David R Hare

(57) ABSTRACT

Methods using a motor, and a rolling tube or rod of sufficient strength to apply a pull force on one side of a sheet on the bed with the patient lying on the sheet to help pull up the patient on his bed or turn patients on his side with little manual effort. Patients having mobility issues under care in homes, nursing-homes or hospitals have to be regularly pulled up and turned on their sides to make them comfortable and to avoid formation of bed sores among other reasons. Currently this is done manually by nurses or caregivers. These simple but strenuous operation has been the cause of back problems for many caregivers. The current method is a way to reduce or eliminate this cause of injury to caregivers by providing a mechanized help for the operations.

20 Claims, 4 Drawing Sheets

(56) References Cited

U.S. PATENT DOCUMENTS

| | | | | |
|---|---|---|---|---|
| 2009/0178193 | A1* | 7/2009 | Jewell | A61G 7/1026<br>5/81.1 HS |
| 2010/0235986 | A1* | 9/2010 | Klyne | A61G 7/1026<br>5/81.1 R |
| 2016/0331617 | A1* | 11/2016 | Stryker | A61G 7/0524 |
| 2019/0070053 | A1* | 3/2019 | Tarakanova | A61G 7/1034 |

* cited by examiner

Note: The rotation of the motor reverses when the polarity at the terminals are changed, from pull to relese

PATIENT TURNER-PULLER

This application Titled: Patient Puller-Turner is a Continuation application of U.S. application Ser. No. 17/017,577 filed on Sep. 10, 2020. Titled: Patient Puller, having a confirmation number 5087. This application is being filed to cover the un-claimed inventive ideas of the original application allowed on Oct. 31, 2022

BACKGROUND SHOWING NEED FOR THE INVENTIVE IDEA

Hospitals and care facilities taking care of invalids and sick patients with limited mobility face a few common problem that seems to be simple but create major difficulty for the nursing staff. This is the activity of moving up patients who have a tendency to slide down beds and turning the patient to make them comfortable and prevent bed sores. This is especially true for mechanical beds that have the capability for raising different portions to make the patients comfortable. When a patient slides down, it makes the adjustment of the bed and turning uncomfortable for the patients. The patients have to be moved-up to make the adjustment capability operate in an efficient fashion to make the patient comfortable. It is also necessary to turn the patient on the bed in a comfortable way. Since the pull-up operation is the more problematic one for the care givers, this application, without being limiting, will focus mainly on that activity.

In most institutions and care facilities moving the patient up the bed and turning the patient are requirements and are done very frequently to make the patient comfortable. Currently this activity is done manually resulting in possible injury to the care givers involved. Typically, the pull-up operation is done by two nursing staff one on either side of the bed, placing the patient on a slide sheet and pulling the patient manually up using the slide sheet. This simple but strenuous operation has been the cause of back problems for many the nursing staff. There has been a lot of teaching on how to correctly do the move without getting hurt, but injuries are still a very real problem that has not been addressed. That is one of the problems addressed by this application.

It will hence be useful to have a way to pull-up or slide up a patient lying horizontally or at a slight angle on a bed, to make his lying position more comfortable, preferably without the involvement of multiple care givers and without fear of injury to the care giver(s) doing the work. This is especially true in these critical time of Covid-19 when there is already a dearth of trained medical staff and care givers.

DESCRIPTION OF FIGURES AND PICTURES

Figure 1:
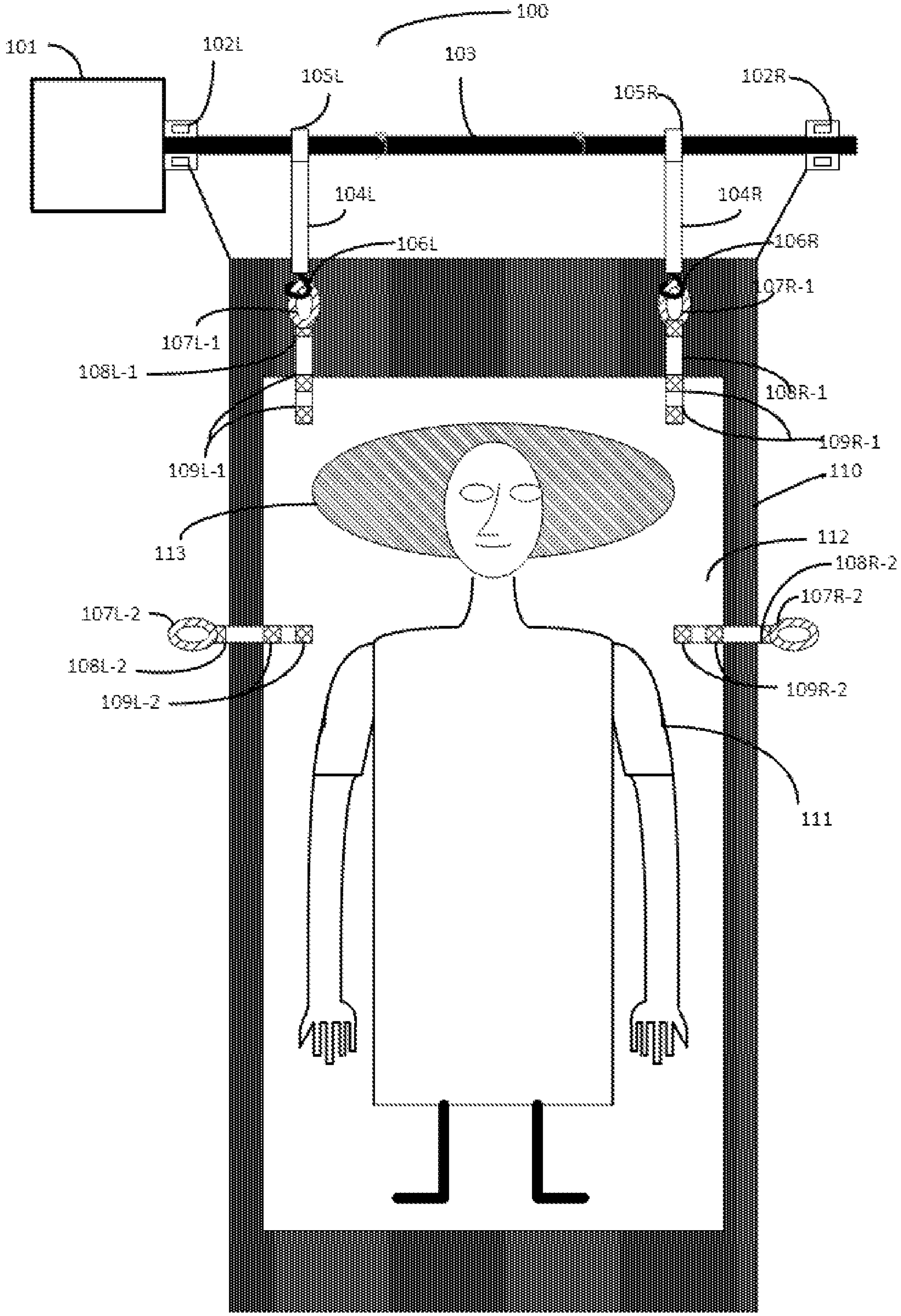

FIG. 1—is a block diagram of the patient puller 100 comprising a motorized unit with electrical switches and a pull-rod and preferably releasable pull straps as per a preferred embodiment.

Figure 2:
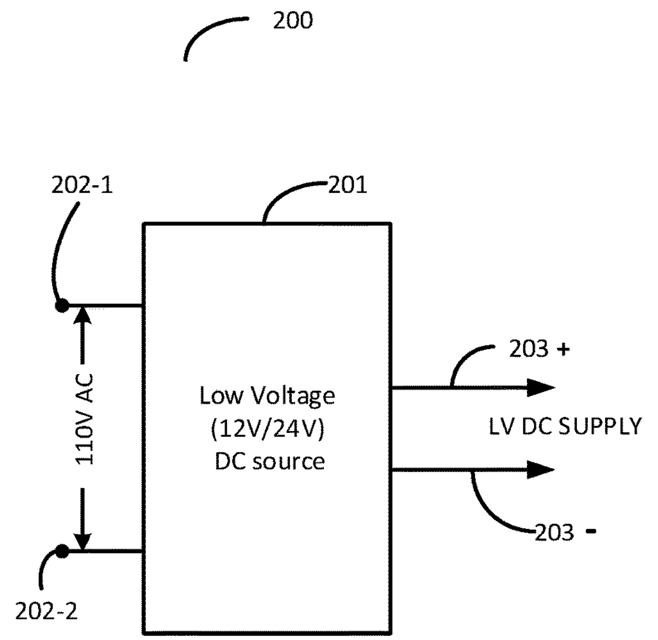

FIG. 2—is a block schematic of the motor, the power supply within the motor housing 101 of FIG. 1

Figure 3:
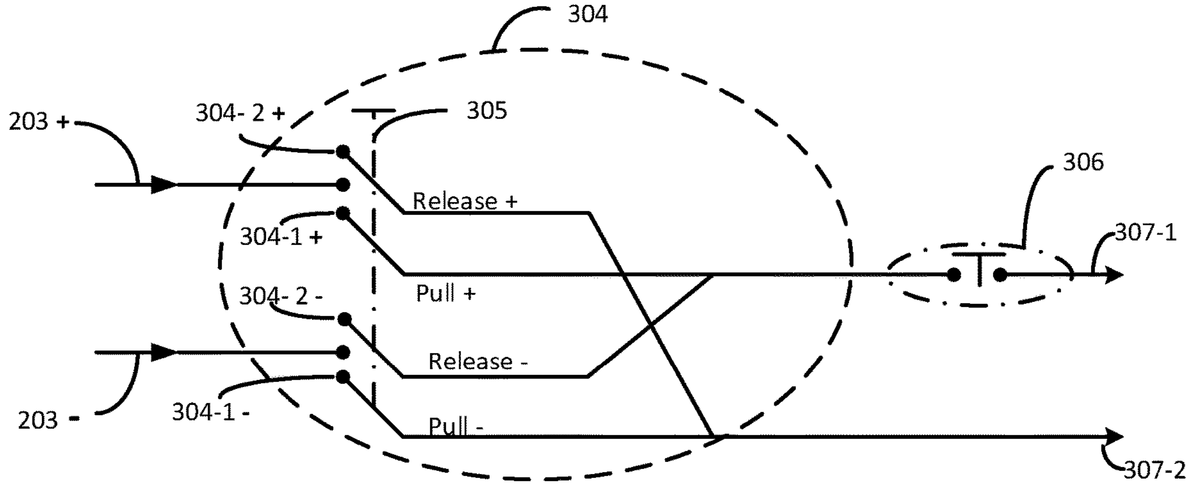

FIG. 3—is a schematic diagram of the switches (Pull-off-Release and safety switches) contained within the motor housing 101 of FIG. 1

Figure 4:
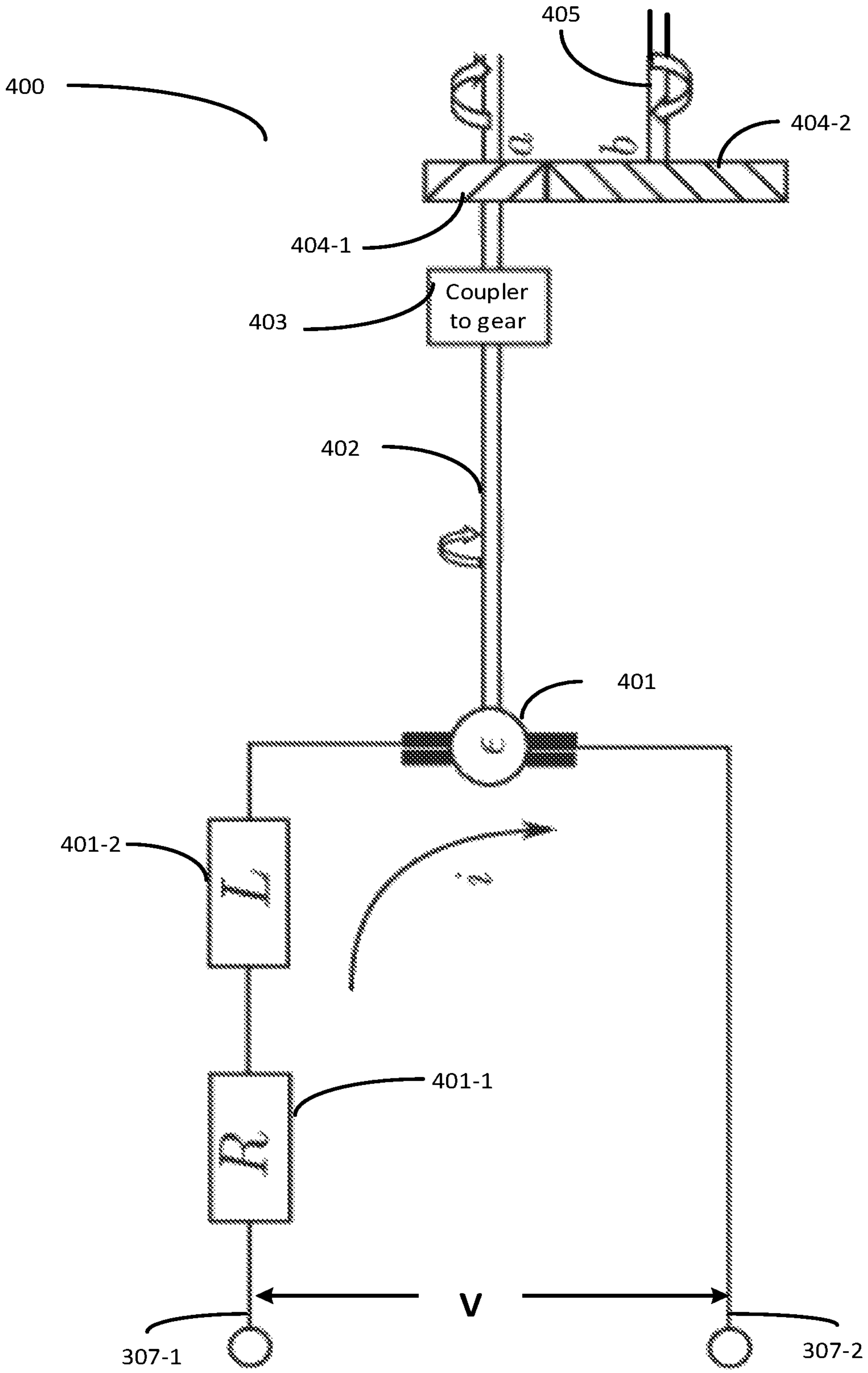

FIG. 4 is the connection diagram for the motor with gears

Figure 5A:
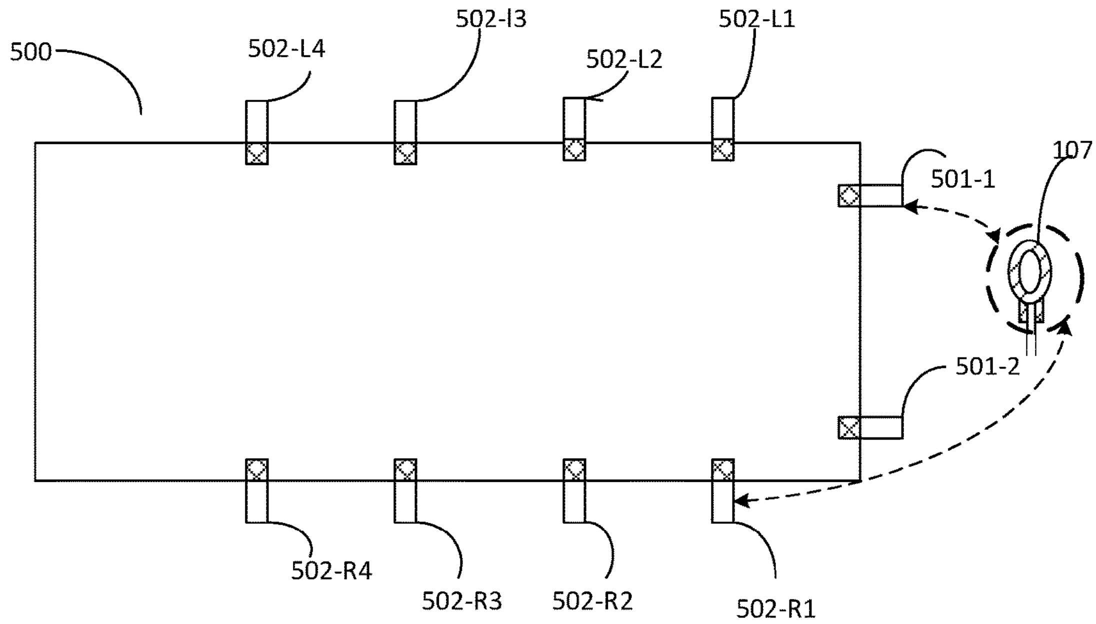

FIG. 5A—is an exemplary layout of an embodiment of the pull-up slide sheet.

Figure 5B:
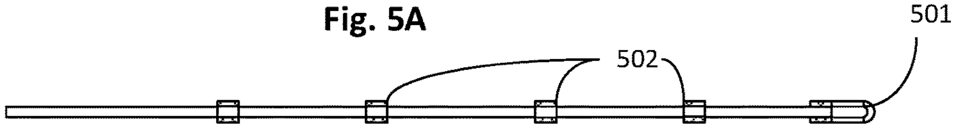

FIG. 5B—is an exemplary side view of the layout of the embodiment of the pull-up slide sheet in FIG. 5A.

Figure 6A:
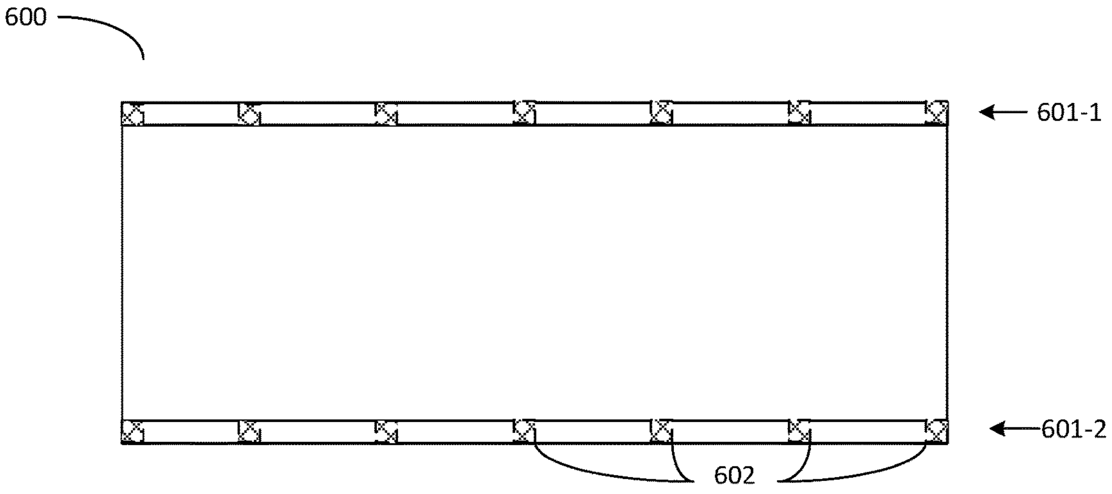

FIG. 6A—is another exemplary layout of an embodiment of the pull-up slide sheet.

Figure 6B:
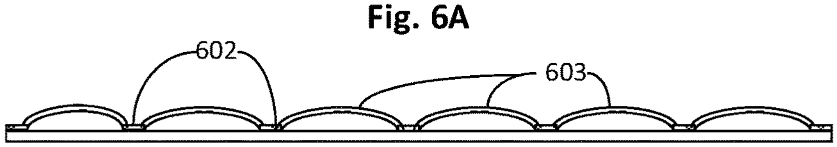

FIG. 6B—is another side view of the layout of the embodiment of the exemplary pull-up slide sheet in FIG. 6A.

SUMMARY OF APPLICATION

In an embodiment of the application a patient puller apparatus for pulling a patient horizontally on a bed is described, the apparatus having a slide sheet on the bed for a patient to lie on having a low friction coating on its underside, the slide sheet having a plurality of loops on its sides, equidistant from its center line where the patient is to be.

Two or more pull-straps having a first end and a second end with clips attached to the first end are provided and the clips during use are for attaching the first end of the pull-strap to one of a pair of the plurality of loops on the slide sheet.

A pull rod located substantially at the level of the patient on the bed, typically at the head of the bed, to reduce the force needed to pull the patient horizontally up the bed is attached to a motor system configured to rotate the pull rod in a pull direction when a pull-release switch that controls the motor of the motor system is turned to a pull position. The second end of the pull-straps attached to the pull rod and the pull rod rolls and pulls the slide sheet and the patient horizontally on the bed when the pull-release switch is turned on to the pull position by pulling and rolling up the pull-straps attached to it on to the pull rod.

The rolling pull rod pulls and rolls up the pull-straps attached to it to exert the necessary pull force on the slide sheet via the connected pull-straps to move the patient horizontally on the bed.

The motor system is enclosed in a motorized puller box enclosure that encloses a reversible electric motor, a power supply, the gear system and the rotating spindle coupled to a reduction gear system for outputting the rotating torque output from the motor system. The gear system consists of a gear box that drives the rotating spindle which is coupled to the pull rod and transfer the rotational torque of the motor to the spindle A coupler is used to couple the spindle to the pull rod and transfer the rotational torque of the spindle to the pull rod. The direction of rotation of the motor, in the pull direction or the release direction is controlled by a DPDT pull-release switch which has a pull position, and off position and a release position. The pull-reverse switch that allows the motor to operate to rotate the pull rod in a pull direction when the switch is set to a pull position or to rotate the pull rod in a release direction that is opposite the pull direction when the pull-release switch is set to a release position.

A second safety switch which is typically a push button switch is provided that can be used to turn on or off the rotation of the motor in typical implemented embodiment.

The slide sheet has long sides and short sides and equal number of pairs of loops are attached to the sides of the sheet on either side of the patient position on the sheet on the bed to enable uniform pull force on either side of the sheet when any pair of loops are used to attach the sheet to the pull rod. The slide sheet loops can be individually attached to the slides of the slide sheet or formed as part of a long tape attached at different locations along the sides of the slide sheet. When the long tape is used, the long tape portions between the attachment locations provide the loop capability. When the loops attached to the slide sheet are connected to the pull rod by clips on the pull-straps, the loop positions are chosen, typically as pairs on opposite sides of the patient, to enable uniform pull force to be applied on both sides of the patient on the slide sheet.

In a one embodiment the pull rod is attached to the bed and is located substantially at the level of the patient on the bed. In another embodiment the pull rod is attached at to a wall at the head of the bed and attachment is substantially at the level of the patient on the bed. In a third embodiment the pull rod and the motor system are attached to the ceiling over the head of the bed and a pulley system with pullies at the level of the patient is used to convert a vertical force of pull on the pull straps connected to the pull rod to a horizontal force by passing the pull-straps over the pullies of the pulley system to enable the patient to be pulled horizontally on the bed using the slide sheet.

In yet another embodiment the ceiling fixed patient puller, if fixed with the pull rod substantially along the center of the bed, will also be helpful in turning the patient on the bed with limited effort on the side of the carte giver. The side loops on one side of the slide sheet can be used to connect to the pull rod to apply a vertical lift force that can be used to turn the patient to the side opposite to the one on which the vertical lift force is applied.

DETAILS OF THE APPLICATION

A pulling mechanism using a motor, and a rolling tube or rod of sufficient strength to pull a patient lying on a sheet on the bed is provided to move patients up the bed with little manual effort. In most hospitals and care facilities a common problems is that patients tend to slip down the beds causing discomfort for the patient. Patients have to be moved-up to comfortable position on the bed. Currently this is done manually by two nursing staff one on either side of the bed, with the patient on a slide sheet and pulling the patient manually up using the slide sheet. This simple but strenuous operation has been the cause of back problems for many nursing staff. The current invention is a way to reduce or eliminate this injury to nursing staff by mechanizing the pull-up operation.

The patient puller is automated helper device that allows a caregiver to pull up a patient lying on a bed to a comfortable position without exertion of too much effort and without being in a position to hurt himself or herself.

FIG. 1 is a block diagram 100 of the system for the pulling up a patient 111 lying on a bed 110. It consists of a patient puller motorized unit 101 with a rotating pull rod 103 with capability to be attached to the bed 110 by clamping units 102L and 102R. Though the unit is shown clamped to the bed in FIG. 1, it is not supposed to be limiting. The system may be made stand-alone and movable where needed. The motorized unit container 101 comprise a motor, the power supply and the necessary switches for their operation. The pull-rod 103 is connected to a rotating shaft 405 driven by the motor within the motorized unit 101. The pull-rod 103 has at least two straps 104L and 104R attached to it at 105L and 105R as shown. These straps 104L and 104R roll up on the pull-rod 103 as the pull-rod 103 rolls. The straps have metal clips 106L and 106R attached to their ends. In operation these clips 106L and 106R get attached to loops 107L1 and 107R1 at the ends of straps 108L1 and 108R1 stitched on at 109L1 and 109R1 respectively to a pull-sheet 112 on the bed 110. Alternate connections are possible at the loops 107L2 and 107R2 at the ends of straps 108L2 and 108R2 stitched on at 109L2 and 109R2 respectively to a pull-sheet 112. The patient 111 is shown lying on the pull-sheet 112 with his/her head on a pillow 113. In the preferred case the pull-sheet 112 has a low friction backing to allow the sheet to be pulled-up easily.

FIG. 2 is a schematic 200 of the DC power supply and the FIG. 3 is the Pull-Off-Reverse and safety switch schematic for the patient puller of FIG. 1.

FIG. 2 shows an AC to DC converter 201 having an AC input of typically 110 V between the input terminals 202-1 and 202-2 which is converted to a low voltage (LV) direct current (DC) supply needed to drive the DC motor as an output between terminals 203+ and 203−.

FIG. 3 shows the switch schematic of the Patient puller. The Low Voltage (LV) DC output across 203+ and 203− is fed into to a Pull-Off-Release (on-off-on) (SPDT) switch the connection schematic of which is shown as FIG. 3. The switch schematic 304 is shown as a three position switch having a first terminal 304-1+ and 304-1− which is wired to provide a pull voltage enabling the correct pull rotation to the motor, a third switch position 304-2+ and 304-2− which is wired to reverse the inputs 203+ and 203− to provide a reverse DC supply voltage at the output, that enable to reverse the motor spin direction. A central second position isolates both inputs 203+ and 203− with no supply to the terminals 304. The switch positions are set by the switch actuator 305.

An optional second switch 306 in series with one of the output terminal is used as an additional protection. Preferably this is a SP-DT or push button switch based on the user's convenience. The final derived outputs to be fed to the motor terminals are at the terminals 307-1 and 307-2

FIG. 4 is a schematic 300 of the low voltage DC motor with gear train used in the exemplary implementation of patient puller 100. Though a DC motor 400 is shown, it is not meant to be limiting. Other types of motors can be used to achieve the needed implementation as is well understood by the electrical and mechanical engineering community. The input voltage is supplied at the motor terminals connected in series with the LV DC output 307-1 and 307-2. When the Pull-Off-Release switch 304 is set to connect to the contacts 304-1+ and 304-1− respectively are motor will roll in one direction due to the torque generated at the armature 410 due to its interaction with the magnetic field of the motor. The internal impedance of the motor is shown as the combination of resistance R 401-1 and the inductance L 401-2. The rotation speed of the motor is transferred to a gear system 404-1 and 404-2 coupled to the axil 402 of the motor to reduce the rotational speed to a manageable speed using a coupler 403. The reduced rotational speed is transferred to the pull rod 405 to pull up the patient on the bed.

FIG. 5A shows an exemplary modified pull-up slide sheet 500, modified with loops 501-1 and 501-2 attached on the top and loop pairs 502-*na* to 502-*nb* attached to the two sides of the slide sheet. In the figure shown n=1 to 4 as there are four pairs of loops distributed on the either sides of the sheet for connection using pull clamps/metal clips 1061 and 106 R at the ends of pull-straps (pull-tapes) 104L and 104 R attached to the rotating pull-rod to pull the patient lying on the sheet 500 up as discussed previously. FIG. 5B is aside view of the sheet in FIG. 5A FIGS. 6A and 6B are layout and side views respectively of another modified slide-sheet 600 with a long tape 601-1 and 601-2 attached at locations 602 at intervals along the two sides of a slide sheet with loops 603 of the long tape 601 between the attached locations 602, that allow the pull clamp to be attached for pulling up the sheet and the patient.

Though the sheet modifications are mainly meant for patient pull up on a bed, another use of the sheet with the side loops is to make it easy to turn the patient with the patient pull up system attached to a ceiling or using another lifting mechanism such as a Hoya lift that can be attached to the loops to lift up the edge/side of the sheet and make it easier to turn a patient on the sheet.

A set of 5 photographs showing an exemplary implementation of the invention is enclosed as APPENDIX A Photograph p-4 shows a patient puller with the enclosure, the switches, the pull rod with pull-straps attached to a patient's bed ready for checking and proof of concept.

Even though the exemplary implementations are shown as a patient puller fixed to the head of the bed, this implementation is not meant to be limiting in any way. The patient puller may be implemented as a mobile system on a movable frame that can be brought and attached to the bed as and when needed for use. The frame can be also be made manually of automatically movable to improve transportability. In locations or patient rooms where floor space is minimum, the patient puller may be attached to the side wall at an appropriate height or attached to the ceiling with a fixed or pull-down capability In case the patient puller is attached directly to the ceiling, it is possible to have the pulley system that is adjustable attached or coupled the head of the bed which will convert a vertical pull to a horizontal pull for pulling up the patient on the slide-sheet. These and other implementation methods that will be easily understood and implementable by the users of the patient puller are all covered by this application. Such a system can be implemented with adjustable pullies that can be lowered and fixed at the appropriate height from the ceiling, in order to avoid taking up space at the head of the bed. These and other optimum implementation methods for the patient puller will be understandable to the users depending on their need, location and space availability. All such modifications are covered anticipated and covered by this application.

It is to be understood that the present disclosure is susceptible to various modifications and alternative forms. Some representative embodiments have been shown by way of example in the drawings and have been described in detail herein. However, the invention is not intended to be limited to the particular forms disclosed. Rather, the disclosure is to cover all modifications, equivalents, and alternatives falling within the spirit and scope of the invention as defined by the claims.

What is claimed is:

1. A method for turning a patient, on the patient's side, horizontally on a bed, the method comprising:

having a patient on a sheet, the sheet having a plurality of loops on sides of the sheet;

using two or more pull-straps having a first end and a second end, with clips attached to the first end;

attaching each of the clips at the first end of the pull-straps each to a different one of the plurality of loops on one long side of the slide sheet, parallel to the patient;

having a pull rod, over and parallel to the patient on the bed, attached to a motor system;

attaching the second end of the pull-strap to the pull rod;

rotating the pull rod in a pull direction using a pull-release switch and a safety switch, by setting the pull-release switch to a pull position and pushing to engage the safety switch;

wherein the rotating pull-rod rolls up the pull-straps attached to the pull rod to exert the necessary pull force on the sheet via the clips connected to the pull-straps to help turn the patient, on the patient's side, horizontally on the bed.

2. The method of claim 1, where in the motor system has a gear box that is a reduction gear system that drives a rotating spindle coupled to the pull rod.

3. The method of claim 2, wherein the motor system is enclosed in a motorized puller box enclosure that comprise an electrical motor, a power supply, the reduction gear system and a spindle;

wherein the gear system transfers the rotational torque of the motor to the spindle and a coupler couples the spindle to the pull rod and transfers the rotational torque of the spindle to the pull rod.

4. The method of claim 3, wherein the motor is a reversible motor which when reversed releases the pull force applied on the sheet via the clips connected to the pull-straps.

5. The method of claim 1, wherein a direction of the motor is controlled by the pull-release switch that causes the motor to rotate the pull rod in a pull direction or a release direction.

6. The method of claim 3, wherein the gear box comprises gears that are reduction gears.

7. The method of claim 1, wherein the push to engage safety switch turns-on or turns-off the rotating motor providing additional safety to the patient during operation of the patient turner.

8. The method of claim 1, wherein having equal numbers of pairs of the plurality of loops attached to the opposite sides of the sheet on either of the long sides of the sheet, on either sides of the patient allows the patient to be turned to either side.

9. The method of claim 1, wherein the pull rod is attached to the bed and is located substantially over and parallel to the patient on the bed.

10. The method of claim 1, wherein the pull rod is attached to a wall or ceiling over the bed and extends substantially over and parallel to the patient on the bed.

11. A method for pulling a patient horizontally on a bed, the method comprising:

having the patient lie on a slide sheet on the bed, the slide sheet having a low friction coating on an underside of the slide sheet, the slide sheet having a plurality of loops on all sides;

having two or more pull-straps each with a first end and a second end, with clips attached to the first end;

attaching each of the clips to one of the plurality of loops at a head side of the patient on the bed, the loops chosen being equally spaced from the patients sides;

having a pull rod with a motor system, attached to a post of the bed or a wall at the head side of the patient, the pull rod being attached at a height equal to a level of the patient;

attaching the second end of the pull straps to the pull rod;

rotating the pull rod in a pull direction using the motor system, by placing a pull-release switch to a pull position and depressing a push to engage safety switch, that is a push-on release-off switch that has to be kept depressed for the motor system to operate, the safety switch providing additional safety to the patient during puller operation;

rolling up the pull straps on the pull rod applies a horizontal pull force to the pull-straps and there from to the slide sheet, pulling up the slide sheet on the bed, thereby moving the patient horizontally up on his bed.

12. The method of claim 11, where in the motor system comprises a gear box that is a reduction gear that drives a rotating spindle coupled to the pull rod.

13. The method of claim 11, wherein the sides of the slide sheet comprise a pair of long sides and a pair of short sides and equal number of pairs of loops are attached to the sides of the sheet on either side of the patient position on the bed to enable uniform pull force on either side of the patient on the sheet.

14. The method of claim 11, wherein the loops are individually attached to the slide sheet or formed as part of a long pull-strap attached at different locations along the sides of the slide sheet with long tape portions between the attachment locations providing capability as attachment loops for the clips.

15. A method for pulling a patient horizontally on a bed, the apparatus comprising:

having the patient lying on a slide sheet with a low friction coating on an underside of the slide sheet having a plurality of loops on all sides of the slide sheet;

having a rod with a pulley system, located substantially at a level of the patient on the bed;

having a pull rod attached to a motor system, attached at a higher level than the patient, to a bedpost, to a wall or to a ceiling above the head side of the bed, to rotate the pull rod in a pull direction when a pull-release switch is turned to a pull position and depressing a push on release off safety switch for further controlling the operation of the motor system;

attaching two or more pull-straps having a first end and a second end, with clips at the first end to the plurality of loops at the head side of the slide sheet, the clip being attached to the loops on the head side of the patient to provide a uniform pull on the slide sheet;

attaching the second end of the pull-straps to the pull rod after passing under pulleys of the pulley system;

rolling the pull rod by turning the motor on to roll and pull the slide sheet and the patient horizontally on the bed with the pull-release switch turned on to the pull position, and depressing the safety switch;

the rolling pull rod pulls and rolls up the pull-straps to exert the necessary pull force on the slide sheet via the connected pull-straps rolling under the pulleys of the pulley system to pull up and move the patient horizontally on the bed.

16. The method of claim 15, wherein locating the pull rod attached to the ceiling with the pulley system substantially at the level of the patient on the bed with the pull straps passing under the pulleys of the pulley system converts the vertical pull force on the pull-straps from the pull rod above the pulleys to a horizontal pull force to pull the slide sheet horizontally on the bed.

17. The method of claim 15, wherein the motor system is enclosed in a motorized puller box enclosure that comprises an electrical motor, a power supply, a gear system and a spindle with a coupler; wherein the gear system transfers the rotational torque of the motor to the spindle and the coupler couples the spindle to the pull rod transferring the rotational torque of the spindle to the pull rod.

18. The method of claim 17, wherein the motor is a reversible motor; and the pull-release switch is configured to reverse a rotation of the motor to release the tension on the pull straps when the motor rotation is reversed by setting the pull-release switch to the release position and depressing the safety switch.

19. The method of claim 15, wherein the slide sheet comprises a pair of long sides and a pair of short sides and equal number of pairs of loops are attached to the sides of the sheet on either side of the patient position on the bed to enable uniform pull force to be applied on either side of the sheet.

20. The method of claim 15, wherein the loops are individually attached to the slide sheet or formed as part of a long tape attached at different locations along the sides of the slide sheet with long tape portions between the attachment locations providing attachment loops for the clips.

* * * * *